Patented Sept. 7, 1943

2,328,593

UNITED STATES PATENT OFFICE 2,328,593

MIXED ALDEHYDE CONDENSATION PRODUCTS AND PROCESS OF MAKING SAME

Gustave Widmer, Basel, and Willi Fisch, Binningen, Switzerland, assignors to Ciba Products Corporation, Hoboken, N. J.

No Drawing. Original application February 19, 1940, Serial No. 319,808. Divided and this application October 21, 1942, Serial No. 462,836. In Switzerland September 28, 1935

9 Claims. (Cl. 260—70)

This invention is concerned with aldehyde condensation products of triazines of the formula

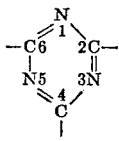

wherein at least one of the free valencies is substituted by an amine group. It comprises the process of manufacture thereof and the new products themselves, as well as their application in the industry.

As typical examples of amino-triazines there may be mentioned the 2.4.6-triamino-1.3.5-triazine [C₃N₃(NH₂)₃] of the formula

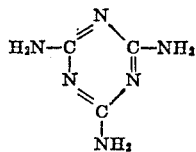

which is commonly called melamine, 2.4-diamino-1.3.5-triazine (formoguanamine) (Formula I), 2-amino-1.3.5-triazine (Formula II)

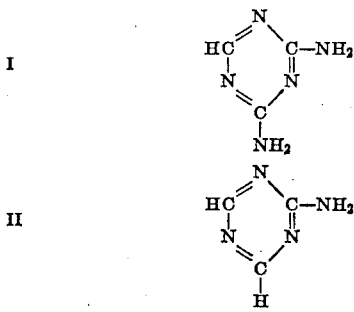

further melam (Formula III), melem (Formula IV), melon (Formula V) which products may be considered as derived from melamine by partial desamidation

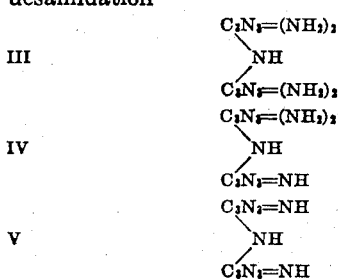

[cf. Journ. Am. Chem. Soc., 44, I, 486 (1922)], or the products wherein one or two amino groups are substituted by hydroxy, halogen, alkyl, aryl or aralkyl groups, such as for instance 2-hydroxy-4.6-diamino-1.3.5-triazine (ammeline) (Formula VI), 2.4-hydroxy-6-amino-1.3.5-triazine (ammelide) (Formula VII)

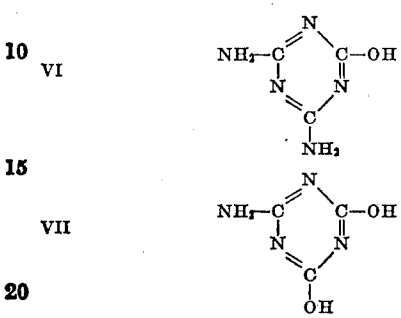

2-chloro-4-6-diamino-1.3.5-triazine (Formula VIII), 2-[phenyl-p-oxy]-4.6-diamino-1.3.5-triazine (Formula IX), 2-phenyl-4-amino-6-hydroxy-1.3.5-triazine (Formula X)

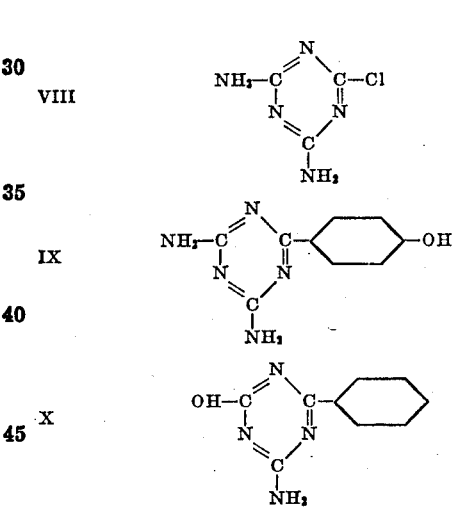

6-methyl-2.4-diamino-1.3.5-triazine (acetoguanamine) (Formula XI). Moreover, also such amino-triazines may be used wherein the hydrogen atoms of the amino groups are partially substituted by amino, alkyl, aryl or aralkyl groups, such as 2.4.6-trihydrazino-1.3.5-triazine (Formula XII)

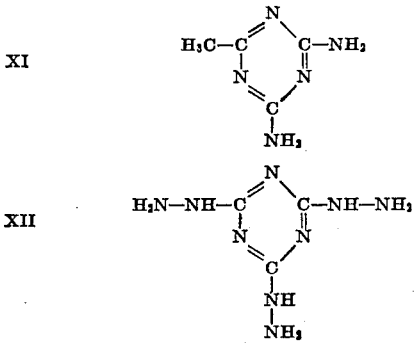

mono-di- or trialkyl-melamines, for instance 2.4.6-triethyl-triamino-1.3.5-triazine (Formula XIII), mono-di- or triaralkyl- or mono-di- or triaryl-melamines, for instance 2.4.6-triphenyl-triamino-1.3.5-triazine (Formula XIV)

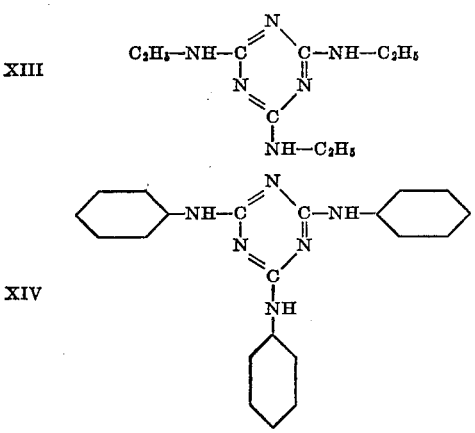

As is known, the triazines are conceivable also in an isoform of the following formula:

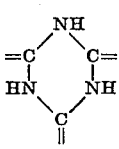

Of course in the case of this isoform also the hydrogen atoms of the cyclic imino groups may be substituted.

As aldehydes there may be used aliphatic aldehydes, such as for instance formaldehyde, acetaldehyde, crotonic aldehyde, acrolein, further aromatic or heterocyclic aldehydes, such as benzaldehyde, furfural and the like.

The term aldehydes includes not only the aldehydes themselves, but also compounds yielding aldehydes, for instance paraformaldehyde, trioxymethylene, paraldehyde, and the like.

The following description relates, in particular, to the production of formaldehyde condensation products from 2.4.6-triamino-1.3.5-triazine (melamine); however, the description applies with obvious modifications to other amino-triazines or their derivatives.

Melamine reacts surprisingly freely with neutral aqueous solutions of formaldehyde and in all molecular proportions of melamine to formaldehyde. In the cold, there are formed, by prolonged action, the methylol compounds which at suitable concentration may separate from the solution in crystalline form. At higher temperatures the methylol compounds are formed in a shorter time, for example boiling for some minutes and cooling to separate the compound. By the further action of heat, further condensation occurs with rapid formation of hydrophilic and then hydrophobic resins, the latter separating as a layer on cooling, or even while hot if the reaction is prolonged. By still further heating, there is finally formed a gummy phase, followed by hardening to an insoluble polymerization product. Correspondingly with the desired condensation product, the reaction may be interrupted at any phase of the condensation and the product separated in known manner by filtration, evaporation, precipitation, decantation, drying or the like. In this manner the whole series of the reaction products of the methylol compounds may find practical application in many directions as hydrophilic and hydrophobic resins.

The hydrogen ion concentration has a very great influence on the speed of the reaction. In the case of neutral or feebly alkaline reaction the condensation proceeds in general very gradually. In the case of feebly acid reaction the speed of condensation is strongly accelerated; also strong alkaline reaction accelerates the condensation.

The desired pH-value may be obtained in known manner by adding inorganic or organic acids or bases or salts thereof.

The condensation may be conducted to produce easily clear, hydrophilic or hydrophobic condensation products with all reasonable molecular ratios of melamine to formaldehyde, for example 1:1 up to 1:20. The hydrophobic properties of the condensation products are liable to be influenced by the pH value. The separated hydrophobe resins which are not yet polymerized to a very high degree have the outstanding property of dissolving to clear solutions in acid. By addition of alkali they are again precipitated and by further addition of acid pass again into solution. These properties are not only those of the resinous condensation products from melamine but are also possessed by the melamine-methylol compounds, and they can be utilized for various purposes, for instance for the precipitation of the condensation products on fibers.

For the manufacture of commercial condensation products it is frequently not necessary to use so much formaldehyde for the reaction as may be the maximum that can be condensed, since the condensation products obtainable with a smaller proportion of formaldehyde have also good commercial properties.

The condensation may be conducted in several stages by first using either melamine or formaldehyde in excess and then causing the mixture to react in one or more stages with the component which was originally in deficiency. For example, 1 mol. melamine may be caused to react with ½ mol. formaldehyde and the product treated with a further quantity of formaldehyde. However, one may also produce condensation products having much formaldehyde and then bring them into reaction with further quantities of melamine.

The reaction between melamine and formaldehyde may occur in an organic medium instead of in water, in which case there are obtained directly solutions of the respective condensation products in organic solvents, which are applicable for the manufacture of lacquers or as additions to lacquers, for example nitrocellulose lacquer. Suitable organic solvents are, for instance, ethyl alcohol, butyl alcohol, acetone, glycerine, benzyl alcohol, or the glycerides of the fatty acids of linseed oil. The condensation may also be produced in mixtures of water and organic solvents, for instance in aqueous alcohol of 50 per cent. strength.

Melamine and formaldehyde may also be condensed with exclusion of solvent, for example with the use of paraformaldehyde.

The application of solvents is advantageous when the reaction is performed in a closed vessel (autoclave), when it is possible to select a reaction temperature above the boiling point of the solvent, for instance ethyl alcohol.

The formaldehyde condensation products of melamine obtained by the reaction described have very good capacity for being hardened by heat, that is to say they are infusible and insoluble under the influence of heat. Furthermore, they are stable to light and free from intrinsic color. They are, therefore, suitable for very many purposes, for instance as masses to be cast or pressed in the industry of plastic masses, as binding agents for the production of molded or laminated products; also for adhesives, especially in the wood-working industry; in the textile industry for dressing, anti-creasing, matting and the like; as lacquer binding agents or additions to lacquers. In many of these applications, particularly in that of molded masses and laminated products, the surprising stability to heat displayed by the condensation products in the heat-hardening is of great advantage, since the operation is not limited to a narrow range of temperature but extends over a considerable temperature interval. The melamine resins are in this respect similar to the phenol-resins. The formaldehyde condensation products of melamine in their hardened condition are surprisingly quite stable to water.

Other aminotriazines or their derivatives may be converted into their corresponding condensation products with formaldehyde in manner similar to that outlined above in the case of melamine.

It is not necessary to use aminotriazine alone in the condensation; it may be mixed with other compounds capable of forming resins, with aldehydes, for instance phenols, urea, thiourea, cyanamide, dicyandiamide, dicyandiamidine, sulfonamides, aniline or the like or a mixture of any of these, the products being mixed condensation products. In this case also condensation may be carried out in several stages, for example the second component may be added to a primary condensation product made with a sufficient proportion or an excess of formaldehyde. It is also possible to mix or condense further the aminotriazine condensation product with another natural or artificial resin, for instance phenol-formaldehyde, or the condensation products from urea or thiourea and formaldehyde. At any stage of the condensation other substances may be added, for instance dyestuffs, filling materials, plasticizers, water-repelling agents or the like.

We are aware of U. S. Specification No. 2,056,142 wherein there is disclosed the addition of small amounts (less than 1 per cent) of melamine as a buffering substance to a urea formaldehyde condensation product. It is evident that in this case there can be no question of a mixed urea melamine resin since the merely catalytic proportion of melamine present in the final product in no way changes its character as a pure urea resin. In contradistinction thereto we have found, however, that already percentages of 5 to 10 per cent. of melamine distinctly improve the properties of the products and have, moreover, a favorable influence on the course of condensation. Thus, for instance, we have found that already when adding 10 per cent. of melamine, calculated on the weight of the urea, the water absorption of the molded final product is reduced nearly to one half. Also the appearance after the boiling test and the cold water test, and the hardness properties after the molding, and the water tests are considerably improved even when adding only a few per cent. of melamine. Furthermore, the speed of condensation is very strikingly enhanced by addition of even small quantities of melamine to a urea formaldehyde condensation mixture. Thus the addition of not more than about 5 per cent of melamine (calculated on the weight of urea) to a neutral condensation mixture of urea and formaldehyde nearly doubles the speed of condensation, an addition of 50 per cent of melamine to the same mixture, in spite of the alkaline buffering action of the melamine, increases the speed of reaction about 20 times.

We wish it thus to be understood that by the term "mixed condensation products" we wish to include all condensation products wherein the proportion of the triazine component calculated on the weight of the other added substance or substances capable of forming resinous condensation products with formaldehyde amounts to at least about 5 per cent.

The following examples illustrate the invention, the parts being by weight unless otherwise stated and the parts by volume and the parts by weight bearing the relationship to one another as that of the litre to the kilo:

*Example 1*

A mixture of 12.6 parts (0.1 mol.) of melamine of the formula

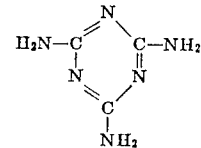

and 75 parts by volume (0.8 mol.) of neutral formaldehyde solution of 32 per cent. strength by volume are heated together in the boiling water-bath until dissolved and the heating is continued for 10 minutes. On cooling flocks separate. After 2 days the crystalline magma is filtered, thoroughly washed with alcohol and dried for 5 hours at 60° C.

The product is a powder of crystalline appearance under the microscope.

Its analysis indicates the formula:

|  | C | H | N |
|---|---|---|---|
| $C_3H_6N_6.6CH_2O.H_2O$: |  |  |  |
| Calculated | 33.2 | 6.2 | 25.9 |
| Obtained | 33.2 | 6.2 | 26.5 |

It melts at about 150° C. to a clear liquid which by further heating passes into a glassy, hard product insoluble in water.

In quite analogous manner there may be produced instead of the hexamethylol-compound other methylol compounds by using a smaller proportion of formaldehyde. These methylol compounds are soluble in hot water and crystallize again on cooling. On addition of acid solutions are obtained which remain clear when cold and are suitable, in particular, as impregnating agents, for instance for textiles.

Example 2

126 parts of melamine (1 mol.) are dissolved in 424 parts by volume of neutral formaldehyde of 31.8 per cent. strength by volume (4½ mol.) by heating in a boiling water-bath under reflux. After heating for 30 minutes, a small sample in a test tube will yield a precipitate of resin when diluted with much water. After 40 minutes a sample will yield a precipitate of resin when diluted with an equal volume of water. At this stage the solution is cooled. 235 parts of this melamine formaldehyde condensation product are kneaded together with 50 parts of cellulose and the mass is dried in the drying chest for 2 hours at 70–80° C. The product is then ground with 0.5 part of zinc stearate and molded into the form of a small plate at 145° C. and under a pressure of about 150 kilogrammes per sq. cm. This molded plate, with 3, 1½ and 1 minutes pressing, becomes very hard and lustrous and shows the following absorption of water:

| Duration of pressing at 145° C. | 3 min. | 1½ min. | 1 min. |
| --- | --- | --- | --- |
| Water absorption after 24 hours immersion in water at room temperature | Per cent 0.9 | Per cent 0.26 | Per cent 0.34 |
| After 10 minutes boiling in water | 0.34 | 1.0 | 1.6 |

Example 3

The directions of Example 2 are followed with half the proportion of formaldehyde named, that is to say with 2¼ mol. formaldehyde per 1 mol. melamine; a wholly similar molding powder is obtained. The pressing properties, as well as the properties of the molded piece obtained, are very similar to those described in Example 2.

Example 4

A condensation solution is produced from 3 mols. aqueous neutral formaldehyde and 1 mol. melamine in the manner described in Example 2 and yields a precipitate of resin when a sample is diluted with twice its volume of water. 200 parts of this solution are kneaded with 40 parts of cellulose, the mixture is dried in a current of air at 70–80° C. and ground with 0.4 part of zinc stearate. The following table shows the remarkable insensitivity to heat of the molding powder even when using extreme hardening temperatures, the time of hardening in each case being 2 minutes:

| Molding temperature | 145° C. | 190° C. |
| --- | --- | --- |
| Flow and hardness when ejected | Very good | Very good |
| Water absorption: | | |
| (a) 10 minutes boiling in water | 0.3% | 0.5% |
| (b) 10 minutes boiling in a solution of citric acid of 1% strength | 0.2% (¹) | 0.15% (¹) |
| (c) After immersion in cold water for 24 hours | 0.23% | 1.7% |

¹ Pieces hard and unchanged.

after 14 days storage in water=pieces unchanged.

The products are remarkably insensitive not only to variations of the molding temperature but also to the duration of the molding, as is shown in the following table, the temperature of molding being in each case 170–175° C.:

| Duration of molding | Water absorption of the product | |
| --- | --- | --- |
| | 10 minutes in boiling water | 24 hours in water at ordinary temperature |
| ¼ minute | Per cent 0.1 | Per cent 0.1 |
| ½ minute | 0.1 | 0.1 |
| 1 minute | 0.1 | 0.15 |
| 3 minutes | 0.1 | 0.5 |

All the molded articles are very hard when hot ejected. Notwithstanding a twelvefold variation in the duration of molding they have all the same light color.

Instead of drying the impregnated cellulose in a current of air in the drying chest as prescribed in Examples 2, 3 and 4, the material is dried in a drying drum or a vacuum chest. It is also possible, as is usual in the case of phenol resins, to dry the mass on the mixing rollers, preferably after a part of the water has been separated by evaporating the condensation solution before the impregnation of the cellulose. In this manner a coherent skin is formed very rapidly which normally diminishes and after coarse comminution the product flows well under pressure in the mold.

Example 5

The melamine resin solution obtained as described in Example 2 is used for impregnating unsized α-paper A and unsized α-paper containing lithopone B. The paper webs, dried in the air, are now piled and the pile is pressed for 10 minutes between polished metal plates at 145° C. under a pressure of about 150 kilos per sq. cm. The product is of homogeneous lamination and is very stable, even when very hot. If these plates are kept at 130° C., for example for 16 hours, their color remains quite unchanged. These laminated products have remarkably low capacity for absorbing water and both after boiling in water or immersion for 1 day in cold water remain perfectly unchanged.

Example 6

1000 parts of finely ground melamine (8 mols) and 2280 parts by volume of commercial formaldehyde (pH=3) of 31.5 per cent. strength (24 mols) are vigorously stirred together on a water bath having a temperature of 75° C. After 15 minutes the reaction mixture has also attained a temperature of 75° C. After a further 5 minutes a sample yields a precipitation of resin when diluted with much water. The reaction solution is at once cooled. There is obtained a clear solution now having a pH value of 7.

The condensation solution is dried on trays in a vacuum chest for 16 hours at 65° C. There is obtained a foamy, dry product which after comminution can be molded in a hot press to produce molded articles which are clear as glass and are very resistant to water, as is shown by the following figures:

|  | Absorption of water | | |
|---|---|---|---|
|  | Molded for 1 minute at 175° C. | Molded for 2 minutes at 145° C. | Molded for 3 minutes at 145° C. |
|  | Per cent | Per cent | Per cent |
| 24 hours in water at room temperature | 0.1 | 0.1 | 0.2 |
| 10 minutes in boiling water | 0.1 | 0.2 | 0.15 |
| 2½ hours in boiling water |  |  | 0.7 |

Example 7

The condensation solution prepared as described in Example 6 is rendered weakly alkaline to phenolphthalein by the additon of an alkaline agent, such as caustic soda solution, and then dried just as described in Example 6. There is obtained in this case a dry product which easily redissolves in cold water. The solutions can be used for coating or impregnation, which may be followed, if required, by hot pressing.

Example 8

126 parts of melamine (1 mol), 360 parts by volume of alcoholic formaldehyde solution of 41.8 per cent. strength (5 mol.), 300 parts by volume of alcohol and 1 part by volume of concentrated hydrochloric acid (0.01 mol) are heated together under reflux to boiling. After about 15 minutes the whole is dissolved. After 45 minutes, the clear solution is cooled. If a sample thereof is diluted with water a resin separates immediately. A sample poured upon glass and hardened at 150° C. yields a hard, clear film.

Example 9

50 parts of a methylol-compound of melamine, obtained as described in Example 1, are added to 80 parts by volume of butyl alcohol and 0.5 part by volume of concentrated hydrochloric acid and the mixture is heated to boiling for ¼ hour. A quite clear solution is obtained which dries and hardens quickly to a hard varnish when heated to a thin layer. Such solutions in butyl alcohol may be added, for example, to nitrocellulose lacquers in order to lend them hardness and filling capacity.

Example 10

126 parts of melamine (1 mol) are condensed with 280 parts by volume of neutral formaldehyde solution of 32 per cent. strength by volume (3 mol) in a reflux apparatus on an open flame by boiling for 30 minutes and the solution obtained is evaporated in a vacuum at about 60° C. to produce a thick syrup. The latter, preferably after addition of a softening agent, for example glycerine, is poured into molds and hardened by gradually increasing the temperature.

The cast masses have an appearance as bright as water and clear as crystal and are of good hardness and stability to water.

Example 11

63 parts of melamine (½ mol) and 120 parts of urea (2 mol) are dissolved in 435 parts by volume of neutral formaldehyde of 31 per cent. strength by volume (4.5 mol) in the boiling water bath and allowed to react for half-an-hour. A sample removed and cooled yields a precipitate of resin. The whole solution is now kneaded with 120 parts of cellulose and the mass is dried and ground. The molding powder thus obtained flows well in the mold when heated for 3 minutes at 145° C. It yields good pressed products of the carbamide-resin type. Instead of urea a mixture of urea and thiourea or thiourea alone may be used.

Many other variations in proportion between melamine and urea may be employed with success.

Example 12

A mixture of 50 parts of melamine (0.4 mol), 37.3 parts of phenol (0.4 mol) and 119 parts by volume of formaldehyde of 40.3 per cent. strength by volume (1.6 mol) is caused to react in feebly acid solution at about 95° C. for half-an-hour. The solution then forms two layers; the whole of the condensation product is kneaded with 60 parts of cellulose and the mass is ground and dried. The molding powder thus obtained flows well and is capable of being molded in known manner in the hot press.

Wide variations in proportion between melamine and phenol are possible.

Example 13

In order to indicate the considerable effect of the hydrogen ion concentration on the speed of the formation of resin the following series of experiments may be cited:

¼ mol melamine was dissolved by boiling aqueous neutral formaldehyde solution of 31 per cent. strength by volume (¾ mol) and the reaction allowed to proceed for 20 minutes under reflux. The whole was then cooled. The stock solution of the melamine condensation product thus obtained can be diluted with water while remaining clear. Portions of 5 cc. each of this solution were mixed with the catalytic addition to be tested and were further condensed in a boiling water-bath under observation.

| Addition | Reaction | pH value | Condensation phenomena | Or behavior of the condensation solution | |
|---|---|---|---|---|---|
| 1. 1 cc. NaOH n/1 | Phenolphthalein, strong red. | 12.5 | After 3 minutes cooling, turbid. | After 6 minutes heating—turbid. | After 15 minutes heating, liquid resin separated. |
| 2. 0.05 cc. NaOH n/1 | Phenolphthalein, red. | 11.0 | After 60 minutes cooling, turbid. | After 140 minutes heating—turbid. |  |
| 3. Original solution | Litmus, blue; thiazole, colorless. | 7.5 | After 45 minutes cooling, turbid. | After 90 minutes heating—turbid. |  |
| 4. 0.05 cc. HCl n/1 | Litmus, weak blue | 7.0 |  | After 3 minutes heating—turbid. | After 6 minutes heating, hard, white. |
| 5. 0.2 cc. HCl n/1 | Litmus, neutral | 6.0 |  |  | After 2 minutes heating, hard, white. |
| 6. 1.0 cc. HCl n/1 | Litmus, weakly acid. | 5.5 |  |  | After 1 minute heating, hard, white. |
| 7. 0.3 cc. conc. HCl | Congo, red | 5.0 |  |  | After ½ minute heating, hard, white. |
| 8. 1.0 cc. conc. HCl | Congo, red brown | 3.0 |  |  | After 2½ minutes heating, clear, gelatinized. |
| 9. 2.0 cc. conc. HCl | Congo, blue | 1.0 |  |  | After 3 minutes heating, clear, gelatinized. |

From the condensation phenomena, turbidity in the cold, in the heat and on the hardening of the condensation product it is purely obvious that the smallest addition of acid, which produces scarcely a variation of the pH, already increases the speed of the reaction in a surprising manner. Larger proportions of acid then produce a still further acceleration which, however, is within normal limits. On the other hand, it is very surprising that even with basic catalysts the reaction is accelerated, but the proportion of base required for the purpose is not so small as in the case of acid.

*Example 14*

126 parts of melamine (1 mol), 90 parts of paraformaldehyde (3 mol. formaldehyde) and 145 parts of woodmeal, together with 1½ parts of zinc stearate, are well mixed together in a ball mill and the molding powder thus obtained is pressed at 145° C. under about 200 kilos per sq. cm. for 2 minutes to form an object. The mass flows well and there is produced a hard molded object of good lustre, and showing a water-absorption, after 10 minutes sojourn in boiling water, amounting to 1.1 per cent.

In an analogous manner the methylol compounds can be worked up with woodmeal to form a molding powder, the mixture being advantageously homogenized on the hot mixing rolls. The skin thus obtained may be coarsely powdered and yields a molding powder which is not hygroscopic. Molded objects made therefrom absorb 0.5 per cent. of water when boiled for 10 minutes in water.

*Example 15*

252 parts of melamine (2 mols.) are heated to boiling with 850 parts by volume of neutral formaldehyde of 32 per cent. strength by volume (9 mols.) in a reflux apparatus on the open flame for 25 minutes. The solution, clear as water, thus obtained is evaporated on the water-bath at 60–70° C. in a vacuum to a syrupy condition. 385 parts of this syrup, corresponding with 260 parts of dry matter, are stirred with 90 parts of gypsum and for dilution there is added so much alcohol of 50 per cent. strength that a glue capable of being well spread is produced. 5 thin plates of wood are coated on one side and piled on one another in crossed form so that the topmost and lowermost surfaces have no layer of glue. The final gluing now follows in the veneer press at a pressure of some kilos per sq. cm. and at a hardening temperature of 100° C. for 30 minutes. There is obtained a thoroughly glued ply-wood plate which proves to be completely fast to water, even boiling water.

*Example 16*

50 parts of nitrocellulose ("½-second-wool") are dissolved in a mixture of 10 parts of tricresylphosphate, 10 parts of butyl alcohol, 50 parts of ethylacetate and 40 parts of toluene. Into this very thick pasty solution there are stirred 100 parts of an alcoholic solution of melamine resin (see Example 8). The solution thus obtained is as clear as water and is diluted for use with a mixture of equal parts of toluene, absolute alcohol and ethylacetate. The solution is cast on glass or metal and dried, and yields a layer which is as clear as water and as smooth as a mirror and hardens when the temperature is gradually increased, and when finally a temperature of 120° C. has been applied for half-an-hour yields films of very good stability to water and of good hardness.

*Example 17*

Bleached cotton fabric is impregnated with the following dressing liquor:

80 parts of potato starch are stirred with cold water and, after the addition of 1000 parts of water, the whole is boiled. After cooling, 10 parts of the melamine-resin solution described in Example 4 are added. The fabric is impregnated, squeezed out and dried at ordinary temperature. It is then subjected to a hardening operation for 4 minutes at 140° C. Laundry tests which have been made on fabric dressed in this manner show that the fabric, even after having been washed 4 times, still has its stiff feel, whereas this is not the case with ordinary starch dressing.

*Example 18*

A melamine-resin is made from 1 mol. melamine and 4½ mol. formaldehyde in the manner described in Example 2. After 30 minutes condensation the solution is evaporated in a vacuum at 60–70° C. to a syrup, whereupon it solidifies overnight to a solid jelly, which after drying for several days in the air disintegrates to a friable, glassy mass. The product is comminuted and hardened for 1 hour at 120° C. It is now insoluble in water but still soluble in acid.

2 parts of this hardened product are dissolved in 10 parts by volume of hydrochloric acid conc. at 70° C. and the solution is diluted to 400 parts by volume by means of water at 35° C. and neutralized with caustic soda solution. A fine, white dispersion is produced. In this liquor, at 35° C., there are treated 10 parts of viscose artificial silk yarn for 20 minutes, then 2 per cent of Glauber's salt are added, calculated on the yarn, and the treatment is continued for 30 minutes. After rinsing the yarn with water it is dried. The artificial silk thus treated has a medium matt appearance which is not removed by warm soaping.

*Example 19*

63 parts of melamine (½ mol) are allowed to react, while intermittently shaking, with 300 parts of neutral formaldehyde solution of 30 per cent. strength (3 mol) in the boiling water-bath for 10 minutes. After cooling, the melamine-methylol-solution thus obtained solidifies to a whitish paste.

96 parts of this paste are stirred with 100 parts by volume of hot water and warmed until a clear solution is obtained. The mixture is then cooled and made up to 190 parts by volume with water. As a softening agent there is next added a solution of 1.35 parts of the mono-carboxylic acid ester from sulfophthalic acid and cetyl-alcohol in 10 parts of water. Bleached cotton voile is impregnated in this solution at ordinary temperature, then pressed to 170 per cent. of the dry weight, dried and hardened on a metal plate during 4 minutes at 150° C. In conclusion, the goods are soaped for 15 minutes at 90° C. with a solution of 5 parts of Marseilles soap and 1 part by volume of ammonia in 1000 parts of water. The fabric thus treated has a soft grip and an essentially improved creasing fastness as compared with the untreated cotton voile.

Example 20

1.1 parts of formoguanamine (2.4-diamino-1.3.5-triazine) of the formula

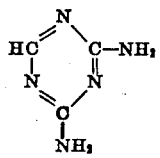

[Berichte d. d. chem. Ges. vol. 25, (1892), page 534], (0.01 mol.) and 3 parts of neutral formaldehyde of 30 per cent. strength (0.03 mol) are heated together on a boiling water bath for 4½ hours and then cooled. There is obtained a clear solution from which a resin is precipitated by dilution with water. By spreading the solution on a support, drying and hardening it at a raised temperature there is obtained a clear, hard coating which is resistant to water.

Example 21

25.4 parts of ammelin (2-hydroxy-4.6-diamino-1.3.5-triazine) of the formula

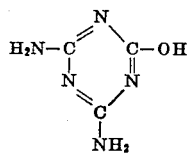

(0.2 mol) are suspended in 188 parts by volume of formaldehyde of 32 per cent. strength by volume (2 mol) and 8.6 parts by volume of hydrochloric acid conc. (0.1 mol) are added. The whole is boiled for about 6 hours under reflux over the open flame. The clear solution is mixed with caustic soda solution until turbidity begins and is used to impregnate 20 parts of ground cellulose. The magma thus produced is fully neutralized by kneading with N/1 NaOH solution and the mass is dried at 70° C. in the drying chest. This product is ground and molded for 3 minutes at 145° C. under 300 kilos per sq. cm. There are obtained hard, transparent molded pieces.

Example 22

70.8 parts (0.2 mol) of symmetrical triphenyl-melamine of the formula

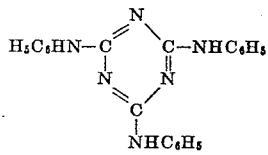

are dissolved in a reflux apparatus on the boiling water-bath together with 63.5 parts by volume of alcoholic neutral formaldehyde of 42.6 per cent. strength by volume (0.9 mol. CH2O), 0.6 part by volume of concentrated sulfuric acid and 63.5 parts by volume of alcohol of 95 per cent. strength. After some minutes a clear solution is produced which after being cooled in ice-water becomes opalescent. The condensation product thus formed is neutralized with alcoholic caustic soda and then completely precipitated by addition of ice-water. It is separated from water by filtration and is dried at 60° C. in a drying chest. There is produced a white powder which when melted at 150–200° C. becomes a brittle, clear resin, insoluble in alcohol and benzine but soluble in benzene, toluene, acetone or the like.

Example 23

A mixture of 7.3 parts of finely pulverized 2-chloro-4.6-diamino-1.3.5-triazine (mono-chloro-melamine) of the formula

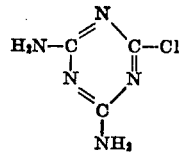

(1/20 mol), 22 parts by volume of formaldehyde of 40.8 per cent. strength by volume (6/20 mol), 12 parts by volume of alcohol of 95 per cent. strength and 1 part by volume of sulfuric acid of 50 per cent. strength by volume is heated to boiling in the water-bath while shaking, whereby everything is dissolved in the course of a few minutes. The solution then becomes turbid and it is therefore further boiled in a reflux apparatus on the open flame for about ½ hour until a clear solution is produced. The latter is evaporated in a vacuum, whereby a condensation product, in the form of a syrup clear as crystal, is obtained. By diluting with water, alcohol or alkali solution the product is precipitated in the form of a white amorphous precipitate.

If, for example, the white precipitate obtained from 10 parts of this syrup by neutralizing it with NaOH is ground finely with 15 parts by volume of alcohol there is obtained a suspension which can be coated. If this is applied as a thin layer on veneer wood laid cross-wise and glued for half-an-hour at 100° C. under a pressure of 5–10 kilos per sq. cm. a normal veneer plate of good resistance to water is obtained.

If, for example, 15 parts of the acid chloro-melamine-resin in the form of syrup are mixed with 7 parts of wood-meal, the mixture dried at 60° C. and ground together with 0.6 part of calcium carbonate there is obtained a molding powder which, when molded at 150–160° C. under a pressure of about 300 kilos per sq. cm. yields mechanically very strong, bright brown, transparent products of good stability to water.

Example 24

6.3 parts of melamine (1/20 mol), 15 parts by volume of alcoholic formaldehyde of 41.8 per cent. strength by volume (about 4/20 mol), 15 parts by volume of absolute alcohol, 0.1 part by volume of concentrated hydrochloric acid (1/100 mol) and 6 parts of the mono-glyceride of linolenic acid are caused to react with each other for 3½ hours under reflux on the boiling water-bath. There is produced a somewhat turbid, feebly yellowish, oily liquid which, on further evaporation, finally solidifies to a tough, clear, gummy mass. If, however, the oily condensation product before solidification is diluted with some benzene, preferably after addition of siccative, and applied on a support and dried in the air, there is obtained after some time a clear, transparent, hard coating which can no longer be scratched by the finger nail.

Example 25

4.7 parts of melam of the formula

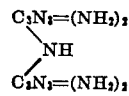

(2/100 mol) are mixed with 20 parts by volume of formic acid and 8.5 parts by volume of an alcoholic solution of formaldehyde of 42.8 per cent. strength by volume (12/100 mol) and 1 part by volume of sulfuric acid of 50 per cent. strength are added and the whole is heated in the oil bath at 110° C., whereby the alcohol is in greater part evaporated. After about 30 minutes an almost completely clear solution of the condensation product is formed, which rapidly becomes oily and finally gelatinous.

If the condensation solution before it gelatinizes is poured on glass and kept in an oven at 60° C. it first gelatinizes and then hardens to a hard, clear film.

If the condensation solution is mixed with alcohol, water, a solution of a base or the like, a white, amorphous product is precipitated.

If the condensation solution is diluted however, for example with hot formic acid, there is obtained a solution which according to the degree of dilution, may be completely diluted with water or, when diluted with water, yield opalescent to whitish colloidal solutions from which by salting out or neutralization the amorphous condensation product of melam is precipitated.

*Example 26*

37.8 parts of ground melamine (0.3 mol), 52.8 parts of acetaldehyde (1.2 mols) and 200 parts by volume of alcohol of 95 per cent. strength are heated to boiling in a reflux apparatus. After 1¾ hours all the melamine has dissolved. The solution is maintained boiling for a further ¾ hour and then cooled. There is obtained a clear solution which when evaporated leaves a dry brittle resin.

*Example 27*

25.2 parts of ground melamine (0.2 mol) and 63.6 parts of benzaldehyde (0.6 mol) are heated to boiling in a small flask having an air-cooled condenser which allows escape of the water formed in the reaction. After ½ hour the melamine has dissolved and a test portion withdrawn from the solution solidifies in the cold to a brittle resin which is soluble in benzyl alcohol. The reaction mixture is boiled for ½ hour longer and then cooled. There is obtained a clear resin which is still soluble in benzyl alcohol.

A quite similar resin is obtained if instead of 63.6 parts of benzaldehyde there are used 127 parts, that is twice the quantity.

This application is a division of our application Serial No. 319,808 filed February 19, 1940, which itself is a continuation in part of our application Serial No. 68,355 filed March 11, 1936, and issued on February 2, 1943, as Patent No. 2,310,004.

What we claim is:

1. A process for the manufacture of mixed condensation products comprising condensing an aldehyde and a triazine of the formula

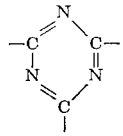

wherein at least one of the free valencies is substituted by an amino group having at least one reactive hydrogen atom, the remaining free valencies being taken up by a radical selected from the group-consisting of hydrogen, hydroxyl, halogen, alkyl, alkylene, aryl and aralkyl, and another substance capable of forming resinous condensation products with aldehydes and selected from the group consisting of urea, thiourea, cyanamide, dicyandiamide, dicyandiamidine, and aniline, the proportion of triazine calculated relative to the weight of said other substance amounting to at least about 5 percent.

2. A process for the manufacture of mixed condensation products comprising condensing formaldehyde and 2:4:6-triamino-1:3:5-triazine (melamine) of the formula

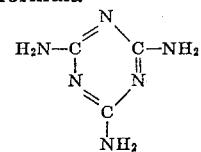

and another substance capable of forming a resinous condensation product with formaldehyde and selected from the group consisting of urea, thiourea, cyanamide, dicyanamide, dicyandiamidine, and aniline, the proportion of melamine calculated relative to the weight of said other substance amounting to at least about 5 percent.

3. The mixed condensation products obtained by condensing an aldehyde and a triazine of the formula.

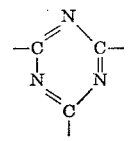

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl, and another substance capable of forming resinous condensation products with aldehydes and selected from the group consisting of urea, thiourea, cyanamide, dicyandiamide, dicyandiamidine, and aniline, the proportion of triazine calculated relative to the weight of said other substance amounting to at least about 5 percent.

4. The mixed condensation products obtained by condensing formaldehyde and 2:4:6-triamino-1:3:5-triazine (melamine) of the formula

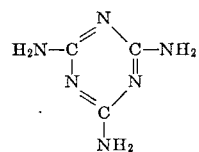

and another substance capable of forming a resinous condensation product with formaldehyde and selected from the group consisting of urea, thiourea, cyanamide, dicyandiamide, dicyandiamidine, and aniline, the proportion of melamine calculated relative to the weight of said other substance amounting at least about 5 percent.

5. A molded article comprising a heat and pressure consolidated condensation product of an aldehyde and a triazine of the formula

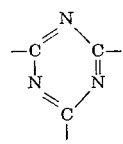

wherein at least one of the free valencies is substituted by an amino group, the remaining free valencies being taken up by a member of the group consisting of hydrogen, hydroxyl, halogen, alkyl, aryl and aralkyl, the amino group containing in toto at least two reactive hydrogen atoms, and another substance capable of forming a resinous condensation product with aldehydes and selected from the group consisting of urea, thiourea, cyanamide, dicyandiamide, dicyandiamidine, and aniline, the proportion of triazine calculated relative to the weight of said other substance amounting to at least about 5 percent.

6. A molded article comprising a heat and pressure consolidated condensation product of melamine and formaldehyde, and another substance capable of forming a resinous condensation product with aldehydes and selected from the group consisting of urea, thiourea, cyanamide, dicyandiamide, dicyandiamidine, and aniline, the proportion of melamine calculated relative to the weight of said other substance amounting to at least about 5 percent.

7. A molding composition capable of being molded under heat and pressure comprising a filler and a heat and pressure consolidatable condensation product of an aldehyde and a triazine of the formula

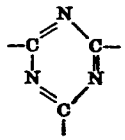

wherein at least one of the free valencies is substituted by an amino group, the remaining free valencies being taken up by a member of the group consisting of hydrogen, hydroxyl, halogen, alkyl, aryl, aralkyl, the amino group containing in toto at least two reactive hydrogen atoms, and another substance capable of forming resinous condensation products with aldehydes and selected from the group consisting of urea, thiourea, cyanamide, dicyandiamide, dicyandiamidine, and aniline, the proportion of triazine calculated relative to the weight of said other substance amounting to at least about 5 percent.

8. A molding composition, capable of being molded under heat and pressure, comprising a filler and a heat and pressure consolidatable condensation product of melamine and an aldehyde, and another substance capable of forming resinous condensation products with aldehydes and selected from the group consisting of urea, thiourea, cyanamide, dicyandiamide, dicyandiamidine, and aniline, the proportion of melamine calculated relative to the weight of said other substance amounting to at least about 5 percent.

9. A molding composition, capable of being molded under heat and pressure, comprising a filler and a heat and pressure consolidatable condensation product of melamine, formaldehyde and urea, the proportion of melamine calculated relative to the weight of the urea amounting to at least about 5 per cent.

GUSTAVE WIDMER.
WILLI FISCH.